United States Patent
Bowen et al.

(10) Patent No.: US 11,636,985 B2
(45) Date of Patent: Apr. 25, 2023

(54) CATHODE SUBASSEMBLY WITH INTEGRATED SEPARATOR FOR ELECTROLYTIC CAPACITOR, AND METHOD OF MANUFACTURE THEREOF

(71) Applicant: Pacesetter, Inc., Santa Clara, CA (US)

(72) Inventors: David R. Bowen, Taylors, SC (US); Ralph Jason Hemphill, Sunset, SC (US); Thomas F. Strange, Easley, SC (US); Troy L. McCurry, West Union, SC (US); Peter Fernstrom, Pickens, SC (US)

(73) Assignee: Pacesetter, Inc., Santa Clara, CA (US)

( * ) Notice: Subject to any disclaimer, the term of this patent is extended or adjusted under 35 U.S.C. 154(b) by 29 days.

(21) Appl. No.: 17/236,999

(22) Filed: Apr. 21, 2021

(65) Prior Publication Data
US 2021/0241978 A1     Aug. 5, 2021

Related U.S. Application Data

(63) Continuation of application No. 15/873,044, filed on Jan. 17, 2018, now Pat. No. 11,017,955.

(51) Int. Cl.
| | |
|---|---|
| *H01G 9/04* | (2006.01) |
| *H01G 9/008* | (2006.01) |
| *H01G 9/10* | (2006.01) |
| *H01G 9/02* | (2006.01) |
| *H01G 9/048* | (2006.01) |
| *H01G 9/14* | (2006.01) |
| *H01G 9/042* | (2006.01) |

(52) U.S. Cl.
CPC .......... *H01G 9/0425* (2013.01); *H01G 9/008* (2013.01); *H01G 9/02* (2013.01); *H01G 9/048* (2013.01); *H01G 9/10* (2013.01); *H01G 9/14* (2013.01)

(58) Field of Classification Search
CPC ........ H01G 9/0425; H01G 9/008; H01G 9/02; H01G 9/048; H01G 9/10; H01G 11/22; H01G 11/24; H01G 11/26; H01G 11/82; H10G 11/52
USPC ................................. 361/502, 503, 508, 516
See application file for complete search history.

(56) References Cited

U.S. PATENT DOCUMENTS

| | | | |
|---|---|---|---|
| 5,930,109 A * | 7/1999 | Fishler | H01G 9/04 361/532 |
| 6,032,075 A | 2/2000 | Pignato et al. | |
| 6,118,652 A * | 9/2000 | Casby | A61N 1/3956 361/535 |

(Continued)

*Primary Examiner* — Arun Ramaswamy
(74) *Attorney, Agent, or Firm* — Gavrilovich, Dodd & Lindsey LLP

(57) ABSTRACT

A cathode subassembly for use in an electrolytic capacitor may include a first separator sheet including a surface having first and second regions, where the second region extends from a perimeter of the first region to a first peripheral edge of the first sheet, a second peripheral edge of a second sheet is substantially aligned with the first peripheral edge, a conductive foil is sandwiched between the first and second sheets and disposed within the first region, the first and second sheets are adhered to each other in a sealing region extending from the second region to a region of a surface of the second sheet facing the second region, and the first sheet includes at least one first recess portion at the first peripheral edge aligned with at least one second recess portion at the second peripheral edge of the second sheet.

20 Claims, 16 Drawing Sheets

(56) References Cited

U.S. PATENT DOCUMENTS

| | | |
|---|---|---|
| 6,141,205 A | 10/2000 | Nutzman et al. |
| 6,321,114 B1 | 11/2001 | Nutzman et al. |
| 6,459,566 B1* | 10/2002 | Casby .................... A61N 1/375 361/535 |
| 6,678,559 B1 | 1/2004 | Breyen et al. |
| 6,819,544 B1 | 11/2004 | Nielsen et al. |
| 7,531,010 B1* | 5/2009 | Feger ..................... H01G 9/048 29/25.03 |
| 2004/0141281 A1 | 7/2004 | Takaoka et al. |
| 2005/0117277 A1 | 6/2005 | Norton et al. |
| 2007/0159768 A1 | 7/2007 | Sherwood et al. |
| 2010/0216027 A1 | 8/2010 | Fujii |
| 2011/0317331 A1* | 12/2011 | Lee ........................ H01G 11/76 361/502 |
| 2013/0027847 A1 | 1/2013 | Aoyama et al. |
| 2015/0140401 A1 | 5/2015 | Minagata |
| 2016/0322626 A1 | 11/2016 | Okuda et al. |
| 2017/0110255 A1 | 4/2017 | Bowen et al. |

* cited by examiner

CATHODE SUBASSEMBLY WITH INTEGRATED SEPARATOR FOR ELECTROLYTIC CAPACITOR, AND METHOD OF MANUFACTURE THEREOF

RELATED APPLICATIONS

This Application is a continuation of U.S. patent Ser. No. 15/873,044, filed on Jan. 17, 2018, and incorporated herein in its entirety.

FIELD

The present disclosure relates generally to the field of electrolytic capacitors and batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Stacked electrolytic capacitors are typically constructed with a plurality of anodes and cathodes, which must be separated by a liquid absorbent insulative material, and are impregnated by an electrically conductive electrolyte. If the separator is not present as a line of sight barrier between any anode and adjacent cathode, there exists a danger of physical contact, as well as electrical breakdown of any incidental gasses present in the completed capacitor. Either of these scenarios would result in an undesirable partial or complete discharge event with a high probability of device failure.

Stacked electrolytic capacitors have utilized physical features in the constituent components of assembly with the aim of assuring precision of physical alignment such that the dimensions of those components leave physical margins that assure adequate separator coverage between all anodes and cathodes. Historically, those features have included holes in the separators, anodes, and cathodes in order to align with features on stacking fixtures when being assembled. These holes constitute undesirably lost surface area in each anode and cathode, which in turn requires compensation either in numbers of anodes and cathodes, or overall physical outline of those components in order to achieve a given design capacitance in the finished part.

The stacked alignment holes result in an undesirably larger overall finished part than would otherwise be required. The stacked alignment holes also create isolated cavities in the finished part which can lead to gas rich, electrolyte starved regions ripe for latent failure. The edges of the holes or other features necessarily create more edge length and complexity of shape for each anode, which increases the challenge of removing them flaw-free from the source anode sheet material.

BRIEF SUMMARY

Device designs are presented that include a cathode subassembly for protecting the device from unwanted discharge, and aiding in manufacture of a stacked electrolytic capacitor configuration including cathodes of the cathode subassemblies and anodes for use in an electrolytic capacitor.

In accordance with an aspect of the present disclosure, a cathode subassembly for use in an electrolytic capacitor may include a first separator sheet including a surface having a first region and a second region, wherein the second region extends from a perimeter of the first region to a first peripheral edge of the first separator sheet; a conductive foil; and a second separator sheet having a second peripheral edge, wherein the second peripheral edge is substantially aligned with the first peripheral edge, and wherein the conductive foil is sandwiched between the first and second separator sheets and disposed within the first region, and wherein the first and second separator sheets are adhered to each other in a sealing region extending from the second region of the first separator sheet to a region of a surface of the second separator sheet facing the second region, and wherein the first separator sheet includes at least one first recessed portion at the first peripheral edge aligned with at least one second recessed portion at the second peripheral edge of the second separator sheet.

In accordance with an aspect of the present disclosure, a device may include a conductive anode; a dielectric material disposed on a surface of the conductive anode; a cathode subassembly, wherein the cathode subassembly includes: a first separator sheet including a surface having a first region and a second region, wherein the second region extends from a perimeter of the first region to a first peripheral edge of the first separator sheet; a cathode; and a second separator sheet having a second peripheral edge, wherein the second peripheral edge is substantially aligned with the first peripheral edge, and wherein the cathode is sandwiched between the first and second separator sheets and disposed within the first region, and wherein the first and second separator sheets are adhered to each other in a sealing region extending from the second region of the first separator sheet to a region of a surface of the second separator sheet facing the second region, and wherein the first separator sheet includes at least one first recessed portion at the first peripheral edge aligned with at least one second recessed portion at the second peripheral edge of the second separator sheet; and an electrolyte disposed between the anode and the cathode subassembly.

In accordance with an aspect of the present disclosure, a method for producing an assembly for use in an electrolytic capacitor may include: providing a first separator sheet cell including a surface having a first region and a second region, wherein the second region extends from a perimeter of the first region to a first sheet cell edge, and wherein the surface of the first separator sheet cell includes adhesive material other than on the first region; disposing a conductive foil on the surface of the first separator sheet cell within the first region; disposing a second separator sheet portion over the first separator sheet cell having the conductive foil within the first region, such that the conductive foil is sandwiched between the first separator sheet cell and the second separator sheet portion; sealing the first separator sheet cell and the second separator sheet portion to each other with the conductive foil sandwiched therebetween, in which the adhesive material seals the first separator sheet cell with the second separator sheet portion; and cutting through the adhesive material sealing the first separator sheet cell with the second separator sheet portion to obtain a cathode subassembly including the conductive foil sandwiched between the cut first separator sheet cell and the cut second separator sheet portion, wherein the cathode subassembly has a peripheral edge formed by a first peripheral edge of the cut first separator sheet cell substantially aligned with a second peripheral edge of the cut second separator sheet portion, wherein the cathode assembly has a sealing region in which the adhesive material seals the cut first separator sheet cell with the cut second separator sheet portion, in which the sealing region extends from the perimeter of the first region to the first peripheral edge, and wherein the first peripheral edge includes at least one first recessed portion substantially aligned with at least one second recessed portion of the second peripheral edge.

DETAILED DESCRIPTION

The following detailed description of capacitor and battery designs refers to the accompanying drawings that illustrate exemplary embodiments consistent with these devices. Other embodiments are possible, and modifications may be made to the embodiments within the spirit and scope of the methods and systems presented herein. Therefore, the following detailed description is not meant to limit the devices described herein. Rather, the scope of these devices is defined by the appended claims.

Figure 1:
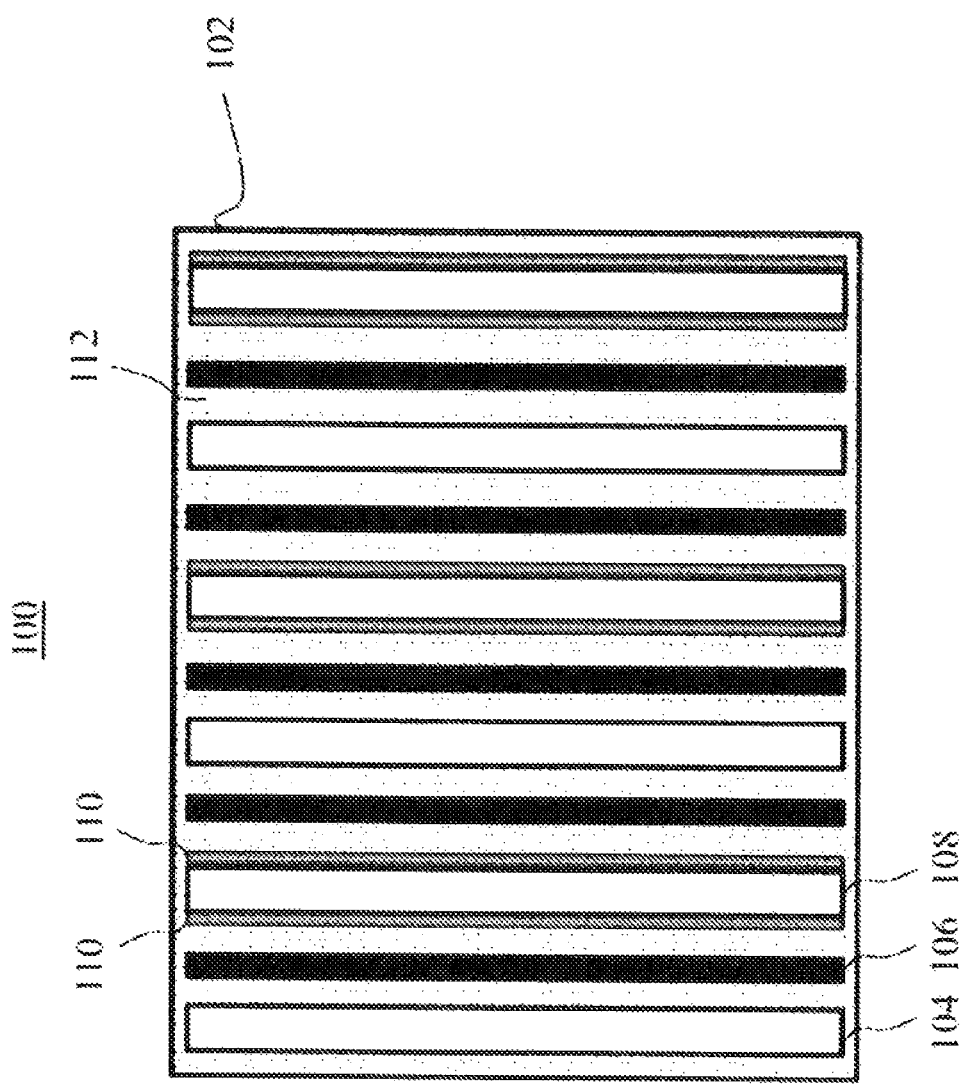
FIG. 1 illustrates a cross-section of an electrolytic capacitor or battery.

FIG. 1 illustrates a cross-section view of an electronic component 100. Electronic component 100 includes a housing 102 that contains a plurality of cathodes 104 alternating with a plurality of anodes 108, and separated by a plurality of separators (or spacers) 106. Each anode 108 includes a dielectric material 110 on or around an outer surface of anode 108. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood to one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, while the plurality of anodes 108 may be similarly connected to a single, common anode terminal.

Electronic component 100 may be, for example, an electrolytic capacitor or a battery. When electronic component 100 is used as a capacitor, example materials for plurality of cathodes 104 include aluminum, titanium, stainless steel, while example materials for plurality of anodes 108 include aluminum and tantalum. When electronic component 100 is used as a battery, example materials for plurality of cathodes 104 include silver vanadium oxide, carbon fluoride, magnesium oxide, or any combination thereof, while example materials for plurality of anodes 108 include lithium metal.

Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108.

Aligning each cathode 104, spacer 106, and anode 108 together in a stack is typically performed using physical features on each element that fit together (such as a peg-in-hole arrangement). As discussed above, this reduces the total usable surface area, which in turn reduces the overall energy density of electronic component 100.

It should be understood that the various elements and dimensions of electronic component 100 are not drawn to scale. Although each of cathode 104, separator 106, and anode 108 are illustrated as being apart from one another for the convenience of illustration and labeling, it would be understood by one skilled in the art that such elements may also be stacked together in close physical contact with one another.

FIGS. 2, 3, 4A, 4B and 4C illustrate a cathode subassembly 200, according to an embodiment of the present disclosure. Cathode subassembly 200 may include a cathode 202 sandwiched between two separator sheets 204 and 206, where the cathode 202 may be enclosed by the sheets 204, 206 except at a terminal or cathode tail 228 of the cathode 202 which extends out from the sheets 204, 206 so as not to be covered by the sheets 204, 206. Separator sheet 204 may be disposed across one surface of cathode 202, while separator sheet 206 may be disposed across the opposite surface of cathode 202. The separator sheets 204 and 206 may be sealed to each other at a sealing region 208 of the subassembly 200 which is at an outer periphery of the sheets 204 and 206. The sealing region 208 may surround the entirety of an outer periphery of the cathode 202, except for a portion of the outer periphery of the cathode 202 forming the cathode tail 228. The integral combination of the cathode sealed in a pocket between the two separator sheets substantially eliminates concern of contact between the cathode of the combination and other external electrodes. The cathode subassembly, thus, may be utilized in a stacked electrolytic capacitor configuration, as described below, without concern that the cathode therein may contact other external components resulting in a short, or may be or become improperly positioned, such as may occur due to misalignment of components during manufacture and handling of the stacked electrolytic capacitor configuration, to allow for arc discharge such as with an adjacent anode.

Cathode 202 may be commonly formed from a metal foil or plate, such as aluminum, titanium or stainless steel. Cathode 202 may be any electrically conductive material that can be formed into a uniform, thin sheet. The cathode tail 228 may be an extension of the material of cathode 202, or be a different material that is bonded to cathode 202. As used herein, the terms "foil," "sheet," and "plate" are used interchangeably to refer to a thin, planar material.

Each separator sheet 204 and 206 may include a high density Kraft paper. Other example materials include woven textiles made of one or a composite of several nonconductive fibers such as aramid, polyolefin, polyamide, polytetrafluoroethylene, polypropylene, and glass. Separator sheets 204 and 206 should be porous enough such that an electrolyte can penetrate through each separator sheet 204 and 206. Any insulating material that can be formed into a uniform, thin sheet with a porous structure may be used for separator sheet 204 and 206. The insulating material preferably shows no dissolution or shrinkage when introduced to the electrolyte. Similarly, the insulating material preferably does not elute any chemicals when introduced to the electrolyte that would damage any part of a battery device including the cathode subassembly over time (e.g., corrosives or, in the case of aluminum electrolytic capacitors, halides.)

Figure 2:
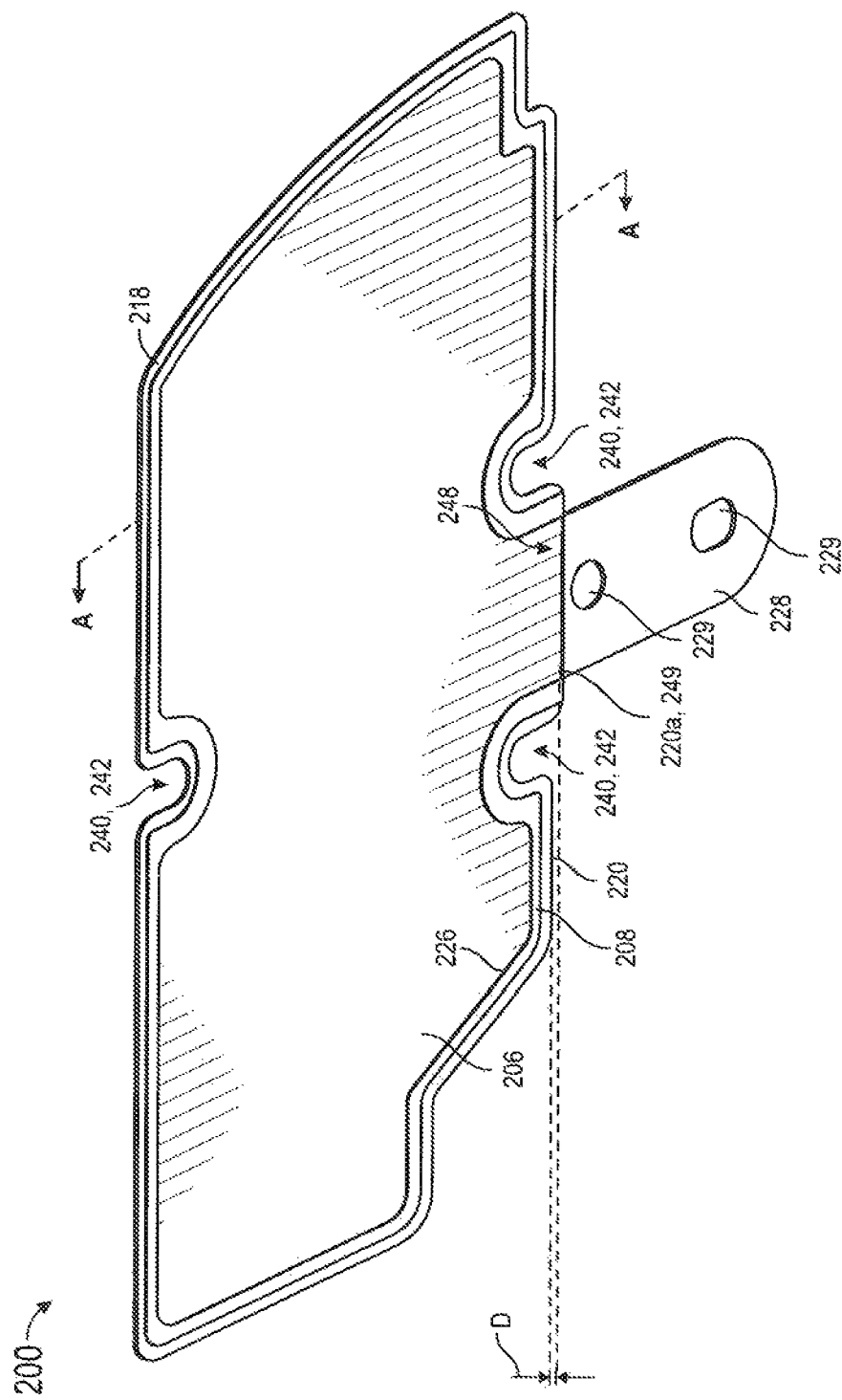
FIG. 2 is a perspective view of a cathode subassembly, according to an embodiment of the present disclosure.
Figure 3:
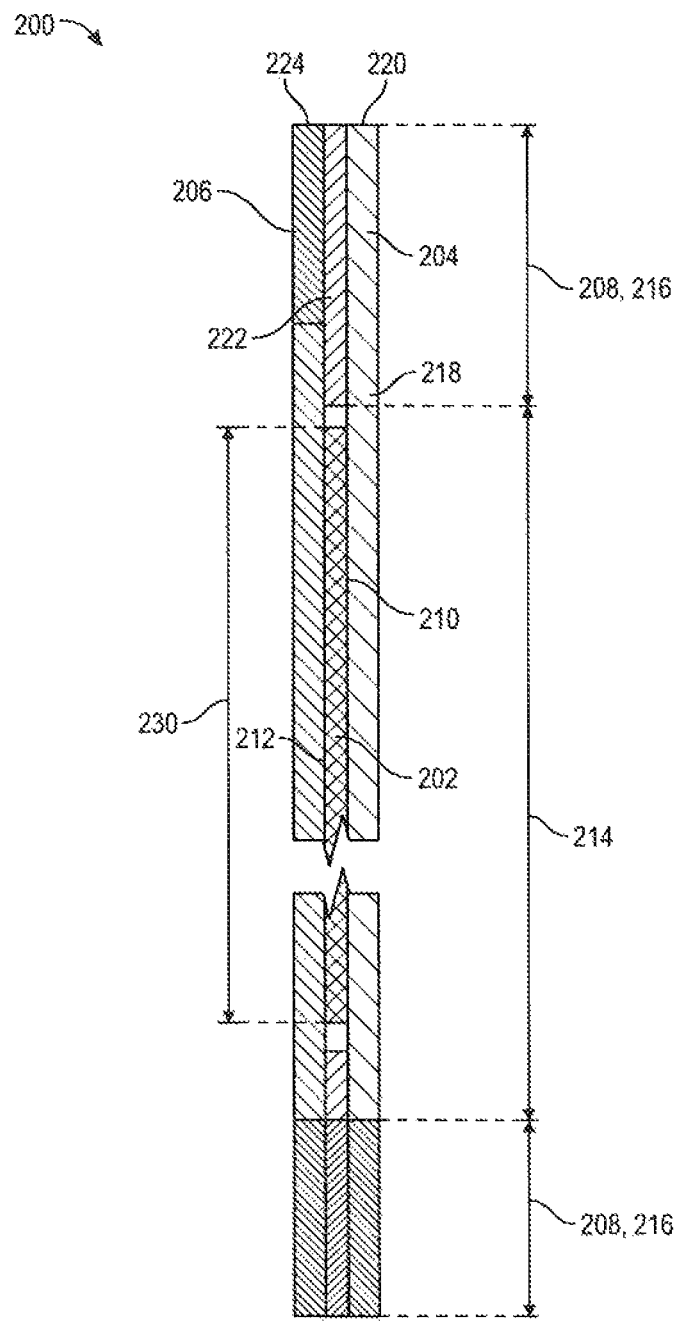
FIG. 3 is a cross-section of the cathode subassembly of FIG. 2 at cross-sectional line A-A.
Figure 4A:
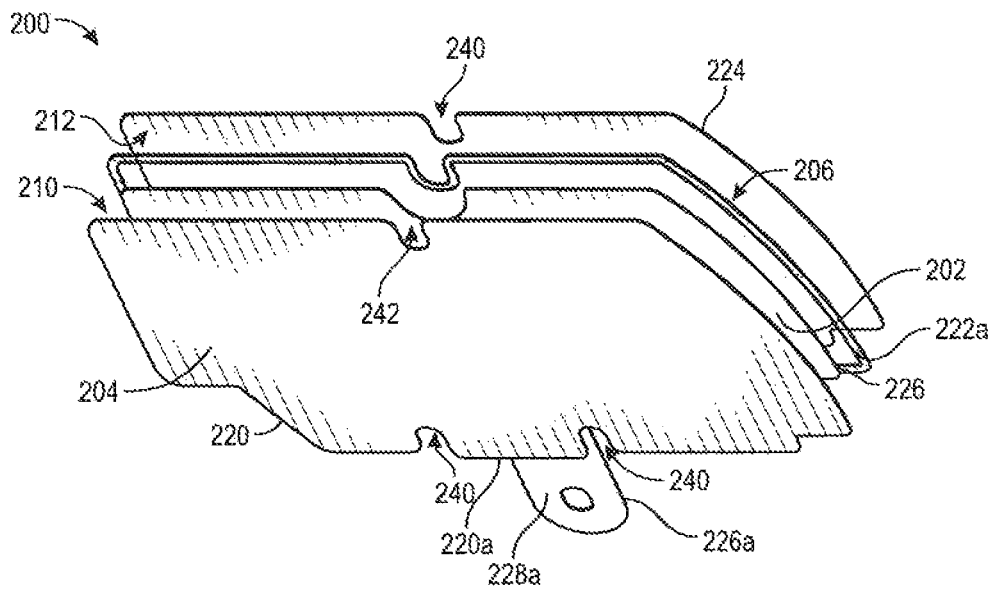
FIG. 4A is an exploded, perspective view of the cathode subassembly of FIG. 2.
Figure 4B:
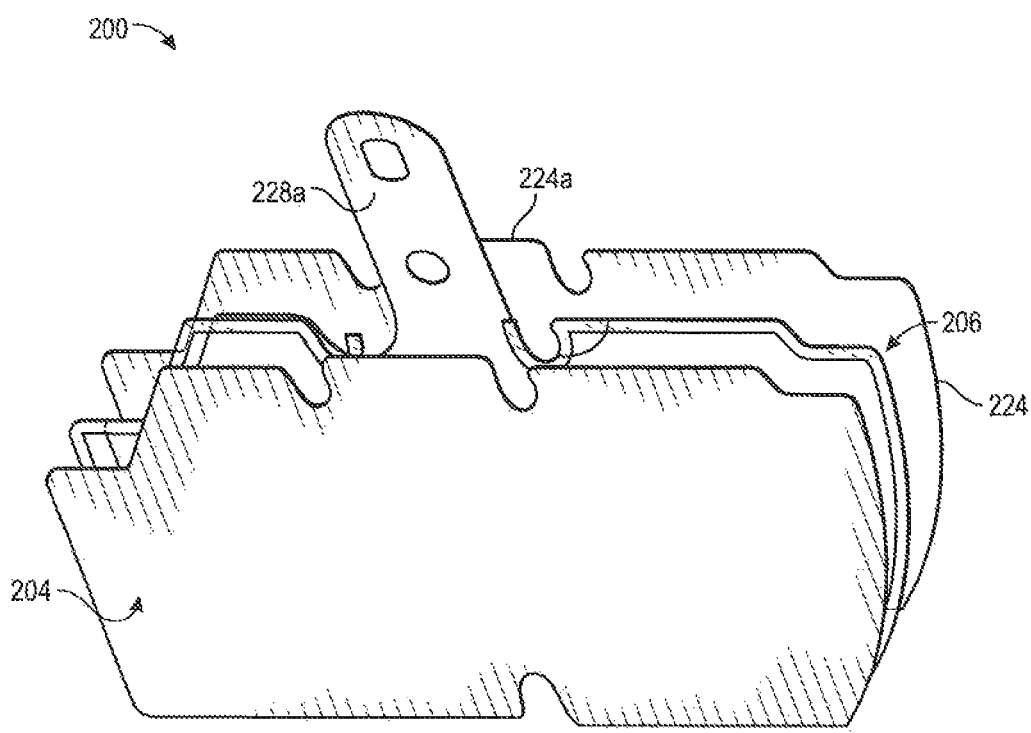
FIG. 4B is another exploded, perspective view of the cathode subassembly of FIG. 2.
Figure 4C:
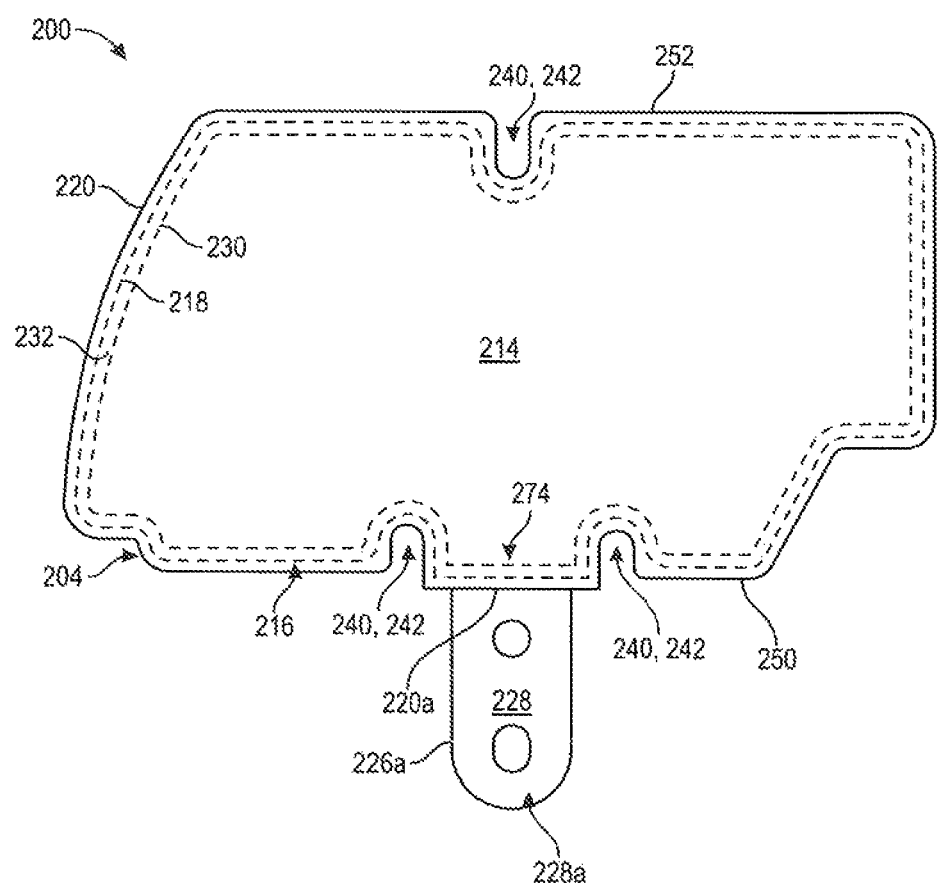
FIG. 4C is a plan view of the cathode subassembly of FIG. 2.

Referring to FIGS. 2, 3, 4A, 4B and 4C, where FIG. 4C includes dashed lines to indicate regions of a surface 210 of the sheet 204 as described below, the sheet 204 is bounded by a peripheral edge 220 including a peripheral edge portion 220a, and the sheet 206 is bounded by a peripheral edge 224 including a peripheral edge portion 224a. The cathode tail 228 extends out from the sheets 204, 206 at the edge portions 220a, 224a. The peripheral edges 220 and 224 are in alignment with each other and together form a peripheral edge of the subassembly 200, except at the portions 220a, 224a. The surface 210 of the sheet 204 may include a first region 214 and a second region 216, where the second region 216 surrounds the first region 214 except at a portion 274 of the first region 214 from which the cathode tail 228 extends out from the sheets 202, 204. The edge portions 220a, 224a are aligned with each other and form, at the portion 274, an outermost periphery of the sheets 202, 204 from which the cathode tail extends out from the sheets 202, 204. The first region 214 is bounded by the edge portion 220a and a perimeter 218 that extends, following a shape of the peripheral edge 220, from one end of the edge portion 220a to an opposite end of the edge portion 220a of the sheet 204. The second region 216 extends from the perimeter 218 of the first region 214 to the peripheral edge 220 of the sheet 204. The second region 216 is not present at the peripheral edge portion 220a.

Referring to FIGS. 2, 3, 4A, 4B and 4C, the sealing region 208 may be aligned with the second region 216, extending from the perimeter 218 to the peripheral edge 220. In addition, the sealing region 208 may include portions of the surface 212 of the sheet 206 which extend from the peripheral edge 224 of the sheet 206 and confront the second region 216. In one embodiment, the sealing region 208 may extend along an entirety of the peripheral edges 220, 224 of the sheets 204, 206 of the subassembly 200, except at the edge portions 220a, 224a.

The perimeter 218 of the first region 214 may have a contour corresponding to a shape of the portion of the peripheral edge 226 of the cathode 202 which is positioned within the region 214 between the sheets 204, 206. In some embodiments, the perimeter 218 may have any shape of any complexity, where the shape of the perimeter 218 corresponds to a shape of the outermost periphery of the portion of the cathode disposed within the first region 214.

Referring to FIGS. 3 and 4A, adhesive material 222 may be disposed in the sealing region 208. In one embodiment, at least a portion or the entirety of the surface 210 in the second region 216 extending from the perimeter 218 to the peripheral edge 220 may include adhesive material 222. The surface 210 in the first region 214 does not include adhesive material thereon. In the sealing region 208, the adhesive material 222 may extend from the surface 210 to a portion of the surface 212 of the sheet 206 confronting the second region 216. In some embodiments, the adhesive material 222 may extend to the peripheral edge 224 of the sheet 206.

In one embodiment, referring to FIGS. 3, 4A and 4B, the adhesive material 222 may be in the form of a strip 222a in the second region 216 which at least partially or completely follows the perimeter 218, and is disposed on the surface 210 extending from the perimeter 218 to the peripheral edge 220.

In one embodiment, the perimeter 218 may be spaced, from facing portions of the peripheral edge 220, a minimum distance sufficient to provide satisfactory permanent sealing of the sheets to each other in the sealing region 208 by the adhesive material 222 in the sealing region 208. In some embodiments, the perimeter 218 may be spaced a substantially same distance from the facing portions of the edge 220 along the entire length of the perimeter 218, and in one embodiment such spacing is about 0.02 inches According to an embodiment, the distance from the perimeter 218 to the facing portion of the peripheral edge of the subassembly 200 may be selected such that the distance is small enough to minimize the overall footprint of the portions of the separator sheets extending away from the peripheral edge 226 of the cathode, but large enough to ensure mechanical robustness and long-time reliability of the seal between the separator sheets in the sealing region.

Example adhesive materials may include UV curable polymers, acrylic polymers, silicones, polyurethanes, polysulfides and cyanoacrylates. According to an embodiment, the adhesive material does not dissolve in the presence of an electrolyte and does not elute any chemicals when introduced to the electrolyte that would damage any part of a battery device over time (e.g., corrosives or, in the case of aluminum electrolytic capacitors, halides). The adhesive material is selected and configured to provide a permanent bond between separator sheet 204 and separator sheet 206 in the sealing region 208, according to an embodiment.

In one embodiment, a thickness of the adhesive material 222 between the sheets 204 and 206 may be equal to or less than a thickness of the cathode 202. By maintaining the thickness of the adhesive material not more than the thickness of the cathode, a high packaging efficiency of the cathode subassembly, which may be included with other components such as anodes, cathodes, separator sheets and additional cathode subassemblies in a stacked electrolytic capacitor configuration as described below, may be achieved.

Still referring to FIG. 4C, in one embodiment, the cathode 202 may have a shape and size such that, when the cathode 202 is disposed in the first region 214, the peripheral edge 226 of the cathode 202 is aligned with dashed line 230 in the first region 214. The line 230 is interior to and has a same or substantially the same configuration as the perimeter 218, and may be uniformly spaced about 0.02 inches from the perimeter 218. The portion of the surface 210 extending from the perimeter 218 to the line 230 defines a margin assembly region 232. The margin assembly region 232 may allow for manufacturing tolerance when the cathode 202 is disposed upon the surface 210, such as by an automated process or manually during manufacture of the subassembly 200 as discussed in detail below, such that the cathode 202 is disposed only within the region 214 and does not contact adhesive material 222 in the second region 216.

In one embodiment, a size of the portion of the cathode 202 disposed in the first region 214 is slightly smaller than the first region 214, such that the cathode 202, except for the cathode tail 228, may fit entirely within the first region 214 and be spaced from the perimeter 218. In another embodiment, the cathode 202 may have a shape and size at the peripheral edge 226, such that the edge 226 is aligned or substantially aligned with the perimeter 218 when the cathode 202 is disposed in the first region 214.

In addition, referring to FIG. 2, in one embodiment, the cathode tail 228 may include apertures 229 extending entirely therethrough. The apertures 229 may provide additional means for aligning individual cathode subassemblies 200 with each other and other components during manufacture of a stacked electrolytic capacitor configuration, as described below.

Further, the peripheral edges 220 and 224 may be configured to include one or more recessed portions 240 and 242, respectively, which are other than at the edge portions 220a and 224a, and which are aligned with each other. The recessed portions 240 and 242 desirably have an identical or substantially identical configuration, and each aligned pair of recessed portions 240, 242 together define an alignment region at the peripheral edge of the subassembly 200. The alignment region, for example, may be arcuate, semicircular or oblong, and may have a shape corresponding to an exterior surface of an alignment element, such as an alignment pin, used in the manufacture of a stacked electrolytic capacitor configuration including the cathode subassembly, as described below. Referring to FIGS. 2 and 4C, the perimeter 218 of the first region 214, the line 230 which defines an interior boundary of the margin assembly region 232 and the peripheral edge 226 of the cathode 202 may, at the alignment region(s) defined by the pair(s) of recessed portions 240, 242, have a shape which is similar or identical to the shape of the alignment region(s). In some embodiments, the perimeter 218 of the first region 214 and the peripheral edge of the portion of the cathode within the first region 214 may have a shape corresponding to the shape of the peripheral edge of the subassembly 200, except at the portion of the peripheral edge of the subassembly 200 defined by the cathode tail 228.

In one embodiment, referring to FIG. 4C, alignment regions of the subassembly 200 may be positioned on a side 250 of the subassembly 200 from which the cathode tail 228 extends outwardly, and also on a side 252 of the subassembly 200 opposing the side 250. For example, the alignment regions may include, at the side 250, an alignment region at each end of the edge portions 220a, 224a, and another alignment region at the side 252 positioned opposite the cathode tail 228. It is to be understood that the alignment regions may be positioned anywhere along the peripheral edge of the subassembly 200, except at the portion of the peripheral edge of the subassembly 200 corresponding to a peripheral edge of the cathode tail 228.

Figure 5:
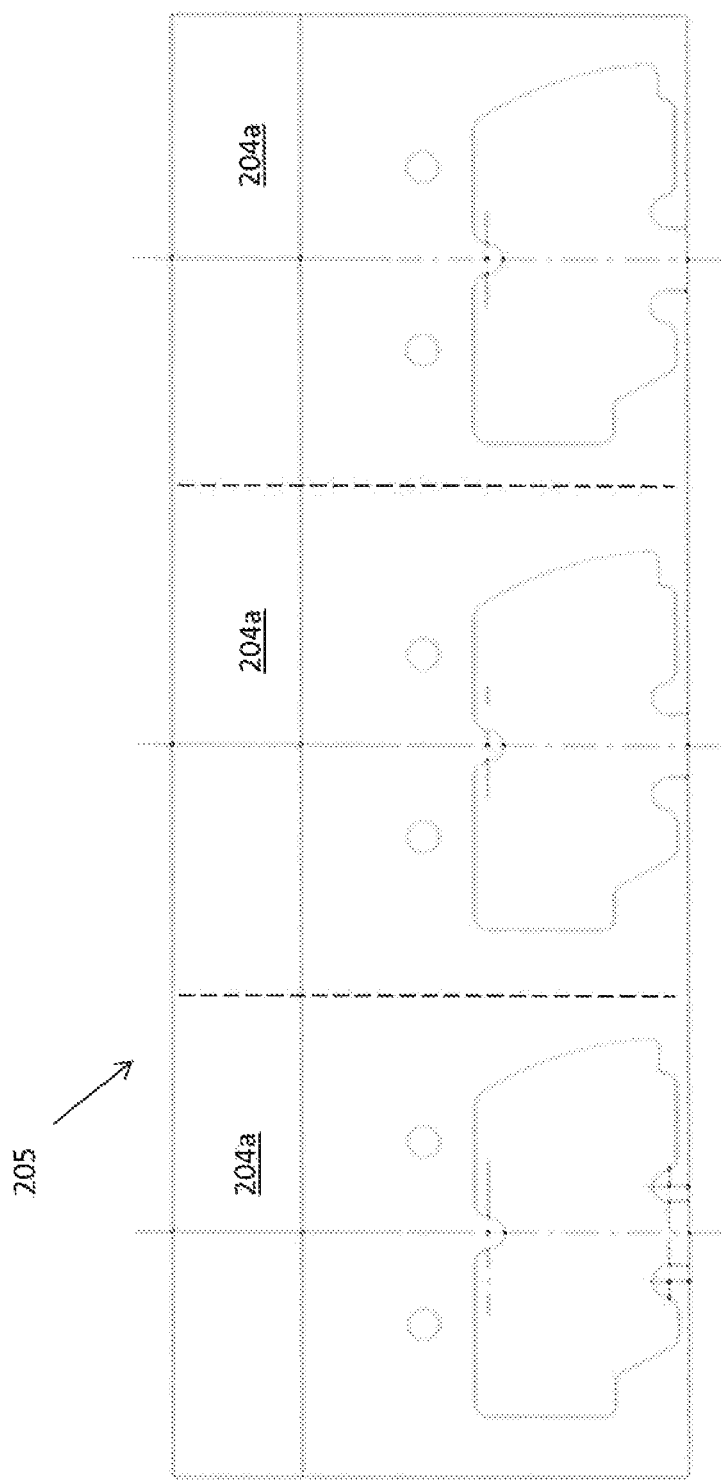
FIG. 5 is a plan view of a bulk separator roll including a plurality of first separator sheet cells for use in manufacture of cathode subassemblies, according to an embodiment of the present disclosure.
Figure 6:
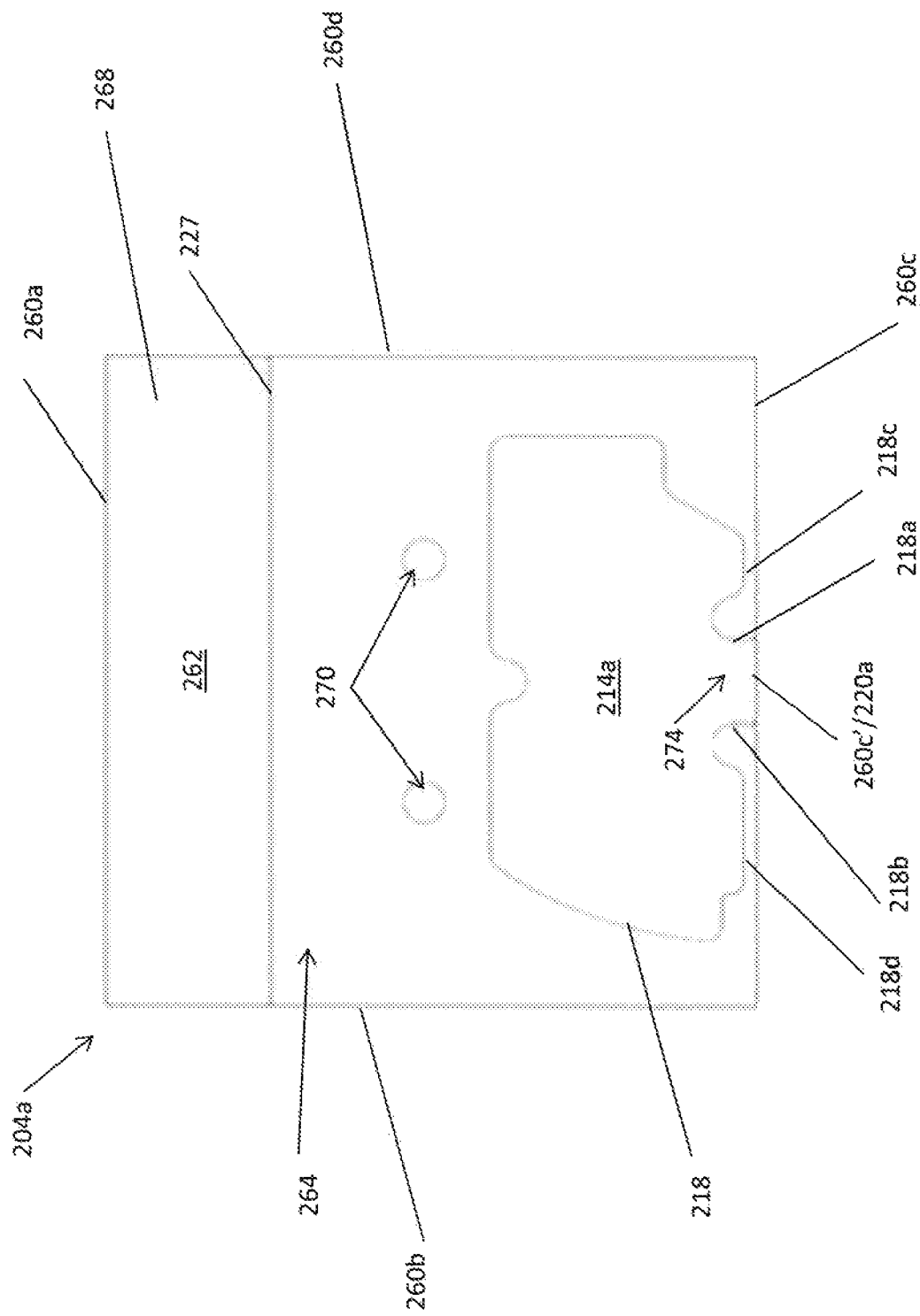
FIG. 6 is a plan view of a first separator sheet cell of the separator roll of FIG. 5, according to an embodiment of the present disclosure.

Referring to FIGS. 5 and 6, in one embodiment, the sheet 204 of the subassembly 200 may be obtained from a sheet roll 205 including a plurality of sheet cells 204a. Each sheet cell 204a may be square- or rectangularly-shaped with outer peripheral edges 260a, 260b, 260c and 260d, and include regions 262 and 264. The region 262 may extend from the edge 260a to a perimeter 227 of the region 262, where the perimeter 227 extends from the edge 260b to the edge 260d. The region 264 may be defined by the perimeter 227, the edge 260c and the portions of the edges 260b and 260d extending from the perimeter 227 to the edge 260c. Adhesive material 222 may be disposed on surface 268 of the sheet cell 204a within the region 264, except in first region 214 of the surface 268 which is within the interior of the region 264. The first region 214 of the sheet cell 204a may have same size and shape as the first region 214 of the subassembly 200. The first region 214 of the surface of the sheet cell 204a, on which the cathode 202 is disposed such that the cathode 202 does not extend beyond perimeter 218 of the first region 214 (see FIG. 7), does not include adhesive material 222.

In some embodiments, the adhesive material may be provided on the separator sheet roll at the above described locations of sheet cells by, for example, selective application. In another embodiment, the adhesive material may be provided at the selected locations on sheet cells 204a, by use of a pressure sensitive peel release liner that provides for selective removal of portions of an adhesive laminate that covers an entirety of a separator sheet roll.

In addition, in some embodiments, referring to FIG. 6, the sheet cell 204a may include apertures 270 extending entirely therethrough, in a portion of the region 264 between the region 262 and the first region 214. The apertures 270 may provide means for holding and moving the roll 205, or individual sheet cells 204a of the roll 205, during a process of automated manufacture of the cathode subassembly.

In one embodiment, as shown in FIG. 6, an edge portion 260c' of edge 260c may define a peripheral edge of the first region 214 which extends between opposing portions 218a and 218b of the perimeter 218 that terminate at respective ends of the edge portion 260c'. The perimeter portions 218a and 218b are spaced from each other so as to define the region 274 within the region 214. The edge portion 260c' corresponds to the edge portion 220a of the sheet 204 of the subassembly 200 that is formed from the sheet cell 204a. As discussed above, and referring to FIGS. 2 and 7, the cathode tail 228 of the cathode may be disposed partially in the region 274 and extend out from the sheets 204, 206 at the region 274.

In one embodiment, referring to FIGS. 2, 4A, 4B, 4C, 6 and 7, the region 274 may be configured to have a size and shape, such that the region 274 of the sheet 202, together with a portion of the sheet 206 aligned with the region 274, forms a protruding or extended separator sheet portion 248 of the subassembly 200 that overlies a portion of opposing surfaces 228a, 228b of the cathode tail 228. In the illustrated embodiment, referring to FIG. 6, portions 218c and 218d of the perimeter 218 may extend from the perimeter portions 218a and 218b, respectively, substantially parallel to the edges 260d and 260b and be spaced from portions of the edge 260c that the perimeter portions 218c, 218d confront. The region 274 may be bounded by the edge portion 260c', which is co-linear with the portions of the edge 260c that the perimeter portions 218c, 218d confront. In one embodiment, referring to FIGS. 2 and 6, a line co-linear with each of the edge portion 220a (edge portion 260c') and the edge portion 224a may be spaced a distance D from adjacent portions of the peripheral edge of the subassembly 200, for example, the portions of the edges 220 and 224 that respectively confront the perimeter portions 218c, 218d, such that the extended separator sheet portion 248 protrudes a distance D in relation to adjacent portions of the peripheral edge of the subassembly 200. For example, the extended separator sheet portion 248 may project away from adjacent portions of the peripheral edge of the subassembly 200 a distance D in a direction substantially orthogonal to the adjacent portions of the peripheral edge of the subassembly 200 which confront the perimeter portions 218c, 218d, respectively, such that a peripheral edge 249 (edge portions 220a, 224a) of the extended separator sheet portion 248, at a furthest projecting point of the portion 248, protrudes, relative to the adjacent portions of the peripheral edge of the subassembly 200, a distance D in a direction substantially orthogonal to the adjacent portions of the peripheral edge of the subassembly 200. The extended separator sheet portion 248 of the subassembly 200 may advantageously avoid potential line of sight arcing discharge and contact between the portion of the cathode tail extending from the cathode subassembly and an anode plate arranged in a stacked electrolytic capacitor configuration adjacent or near to the cathode subassembly, during manufacture of a stacked electrolytic capacitor configuration as described below.

Figure 7:
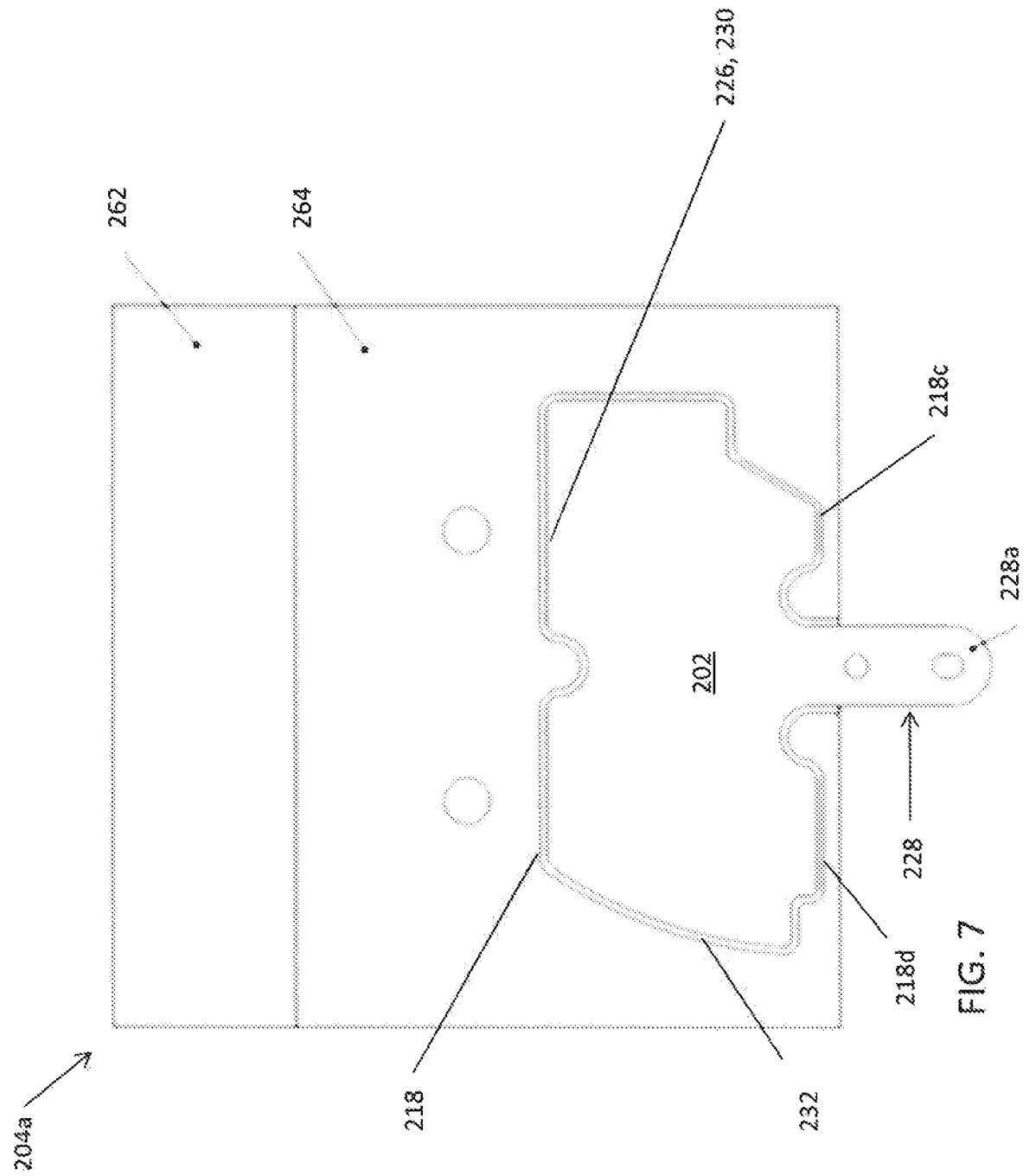
FIG. 7 is a plan view of a partially manufactured cathode subassembly, according to an embodiment of the present disclosure
Figure 8:
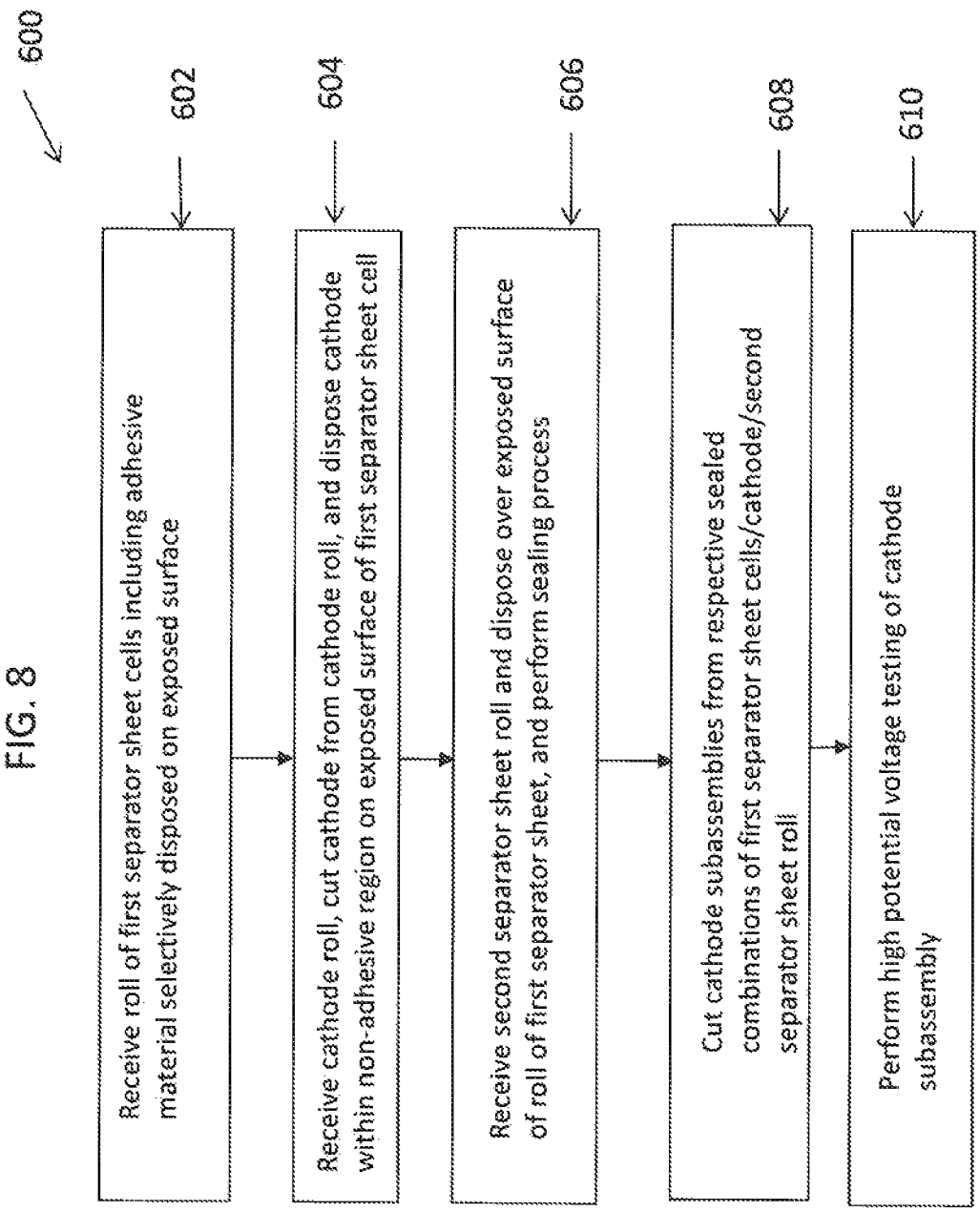
FIG. 8 is a flowchart of a process for manufacture of a cathode subassembly, according to an embodiment of the present disclosure.

Flowchart of FIG. 8 illustrates a process 600 for manufacture of a cathode subassembly, as described above with reference to FIGS. 2, 3, 4A, 4C, 5, 6 and 7. The process advantageously may repeatedly obtain a peripheral edge of a cathode subassembly, which is formed from aligned peripheral edges 220, 224 of the sheets 202, 204 as described above, within design constraint margins of about +/−0.01 to 0.002 inches. Accordingly, a stacked electrolytic capacitor configuration, which includes the cathode subassemblies of the present disclosure and other components including anodes, cathodes and separator sheets, may be manufactured to have a composite peripheral edge which is within design constraint margins of about +/−0.01 to 0.002 inches. The process 600 may be performed using an automated assembly machine, or alternatively manually.

Referring to FIG. 8, in block 602, a first separator sheet roll 205, such as illustrated in FIGS. 5-6, including a plurality of first separator sheet cells 204a, each having the features as described above, may be provided, for example, on a conveyor belt of an automated assembly machine. The roll 205 may be provided on the conveyor belt with the surface 268 including adhesive material 222 selectively disposed thereon exposed, and the apertures 270 of the respective sheet cells 204a may provide for holding and locating the roll 205 on the conveyor belt.

In block 604, a roll of cathode foil may be supplied to the assembly machine, and then a cathode 202 may be cut therefrom, with a laser or by die cutting as conventional, such that a shape of an outer peripheral edge of the cathode 202 corresponds to a shape of the perimeter 218 of the first region 214. In one embodiment, the cathode may be cut such that the portion of its outer peripheral edge to be disposed in the first region 214 substantially corresponds or is identical in size and shape to line 230 defining the margin assembly region 232, as shown in FIG. 4C. Further, in block 604 the cathode 202 may be placed on one of the separator sheet cells 204a within the region 214, such that no portion of the cathode extends beyond the perimeter 218 and, thus, the cathode is not in contact with the adhesive material 222 in the region 264 surrounding the perimeter 218.

In one embodiment, the cathode may be cut to a size and shape such that the cathode fits entirely within the region interior to the assembly margin region 232, as shown in FIG. 7.

In one embodiment, the adhesive material may be colored, for example, with a dye, such that a vision system of the assembly machine may, based on the color of the adhesive material, readily align the cathode with the region 214, and desirably provide that the cathode is placed within the region 214 interior to the assembly margin region 232.

In block 606, a roll of second separator material ("second separator roll"), which is formed only from separator material and does not include adhesive material, may be provided for use in formation of the separator sheet 206 of the cathode subassembly. The second separator roll may be fed into the assembly machine, and suitably manipulated within the machine such that the second separator roll is placed over the exposed surface of the first separator roll 205 containing cathodes placed respectively within regions 214 of the sheet cells 204a. The second separator roll may then be pressed against the roll 205 with the cathodes thereon, to activate pressure activated adhesive material 222 on the roll 205. By activation of the adhesive material, a seal may be created between surface portions of the separator sheet cells 204a at which the adhesive material is disposed and portions of the second separator roll overlying the adhesive material on the sheet cells 204a. For each sheet cell 204a, a cathode is within the region 214, and is sealed between the sheet cell 204a and the overlying portion of the sheet 206 except at the edge portion 260c' of the sheet cell 204a.

In block 608, cutting may be performed through each of the sheet cell 204a/cathode/second separator roll combinations as sealed in block 606, by use of a laser, die, mechanical shearing, cleaving or the like, to obtain individual cathode subassemblies 200 having an outer periphery which is sealed except at the portion of the periphery of the subassembly 200 corresponding to the cathode tail 228 that extends out from the sheets 202, 204, as shown in FIG. 2. Referring to FIG. 3, the sealed portion of the outer periphery of the cathode subassembly 200 may be formed by edges 220 and 224 aligned with each other, except at the edge portions 220a, 224a. As discussed above, the cathode tail 228 is disposed in the region 274 and extends away from the sheets 202, 204 at the aligned edge portions 220a, 224a. At other than the portions 220a, 224a, the edges 220, 224 may be spaced about at least 0.020 inches from the perimeter 218 by the sealing region 208 of the cathode subassembly, which extends from the perimeter 218 to the edges 220 and 224.

In block 610, each cathode subassembly as obtained in block 608 may be individually tested to insure a satisfactory seal in the sealing region. For example, the testing may be performed by disposing the cathode subassembly between two conductive plates under pressure and applying a predetermined high potential voltage ("withstand voltage") to insure that there is no arcing or other defect noticed. For example, a withstand voltage of 600 volts may be applied during testing of the subassembly, to insure that the subassembly may operate without failure when included as part of a stacked electrolytic capacitor configuration in a capacitor having a 450 Volt working voltage specification.

The testing of the individual cathode subassemblies following their manufacture may advantageously improve yield and reduce waste of resources in the manufacture of stacked electrolytic capacitor configurations which include the cathode subassemblies. In particular, by performing testing of only the cathode subassembly before the subassembly is assembled into a stack with other components, the need to discard the entirety of the components of the stack, such as when a cathode subassembly in the stack has a defect and causes the entire completed stack to fail testing following manufacture of the stack, may be avoided. Thus, based on manufacture of a stack including cathode subassemblies according to the present disclosure, a high degree of certainty may be obtained that the stack would perform satisfactorily as an electrolytic capacitor, based on testing of the individual cathode subassemblies before same are included in a stack.

Further, the substantially sealed, integrated structure of the cathode subassembly completely or almost completely eliminates the possibility of line of sight arc discharge or contact between anodes, and the cathodes within cathode subassemblies, in a completely manufactured stacked electrolytic capacitor configuration, because the cathodes, except for the cathode tail, are disposed within an enclosure or pocket formed by the first and second separator sheets. The pocket in which the cathode in the cathode subassembly is disposed avoids the need to manufacture a stacked electrolytic capacitor configuration in accordance with a design constraint requiring offset of cathodes from adjacent anodes, because the sheets forming the integral subassembly serve as an insulative barrier between edge portions of anode plates in the stack and the cathodes in the adjacent cathode subassemblies, thereby substantially or completely eliminating the potential of contact or line of sight arc discharge therebetween.

In addition, the portion of the sheet 202 at region 274 and the overlying portion of the sheet 204, which form an extended sheet portion of the subassembly 200, are configured to avoid line of sight arc discharge and contact between edge portions of an anode plate in a stack and exposed portions of cathode tails which extend away from the edge portions 220a, 224a of the cathode subassemblies included in the stack with the anode plate. Thus, design requirements for offset of a cathode from an anode, such as the peripheral edge of the cathode being retracted by a predetermined amount from the peripheral edge of an overlying or underlying separator sheet and an anode in a stack, and a minimum line of sight barrier for a stack, such as 0.070 inches for a line of sight barrier from a cathode peripheral edge to an anode peripheral edge, may be eliminated or relaxed, by providing cathodes in the stack which are integrated within cathode subassemblies in accordance with the present disclosure.

Advantageously, according to the present disclosure, a single integrated assembly of the cathode and a separator may be obtained in the form a cathode subassembly, in which the cathode is sealed therein by the two separator sheets and adhesive material as described above, which includes an electrolyte permeable physical barrier to access surfaces of the cathode, which has a substantially uniform thickness and thickness not exceeding a combined thickness of the cathode and the two separator sheets, which includes alignment regions at the peripheral edge to ease manufacture in a stacked electrolytic capacitor configuration with other components included in the stack, and where the cathode is sufficiently sealed by the separator sheets and adhesive combination to electrically support a design voltage operation for the cathode, such as when included in an electrolytic capacitor.

Figure 9:
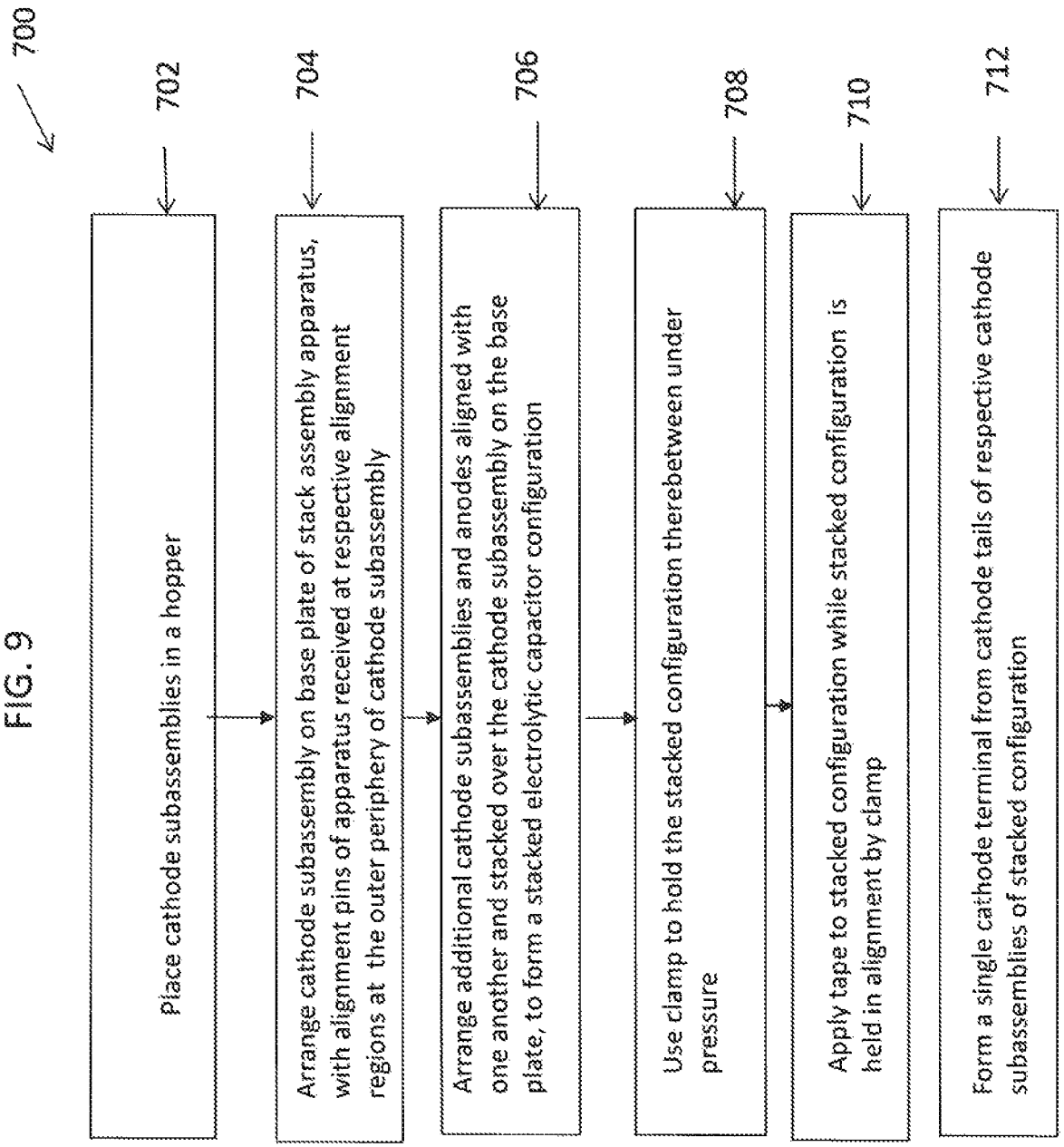
FIG. 9 is a flowchart of a process for manufacture of a stacked electrolytic capacitor configuration including a cathode subassembly, according to an embodiment of the present disclosure.

Flowchart of FIG. 9 illustrates a process 700 for manufacture of a stacked electrolytic capacitor configuration including one or more cathode subassemblies of the present disclosure, such as manufactured according to the process 600, in accordance with an embodiment of the present disclosure.

Figure 10:
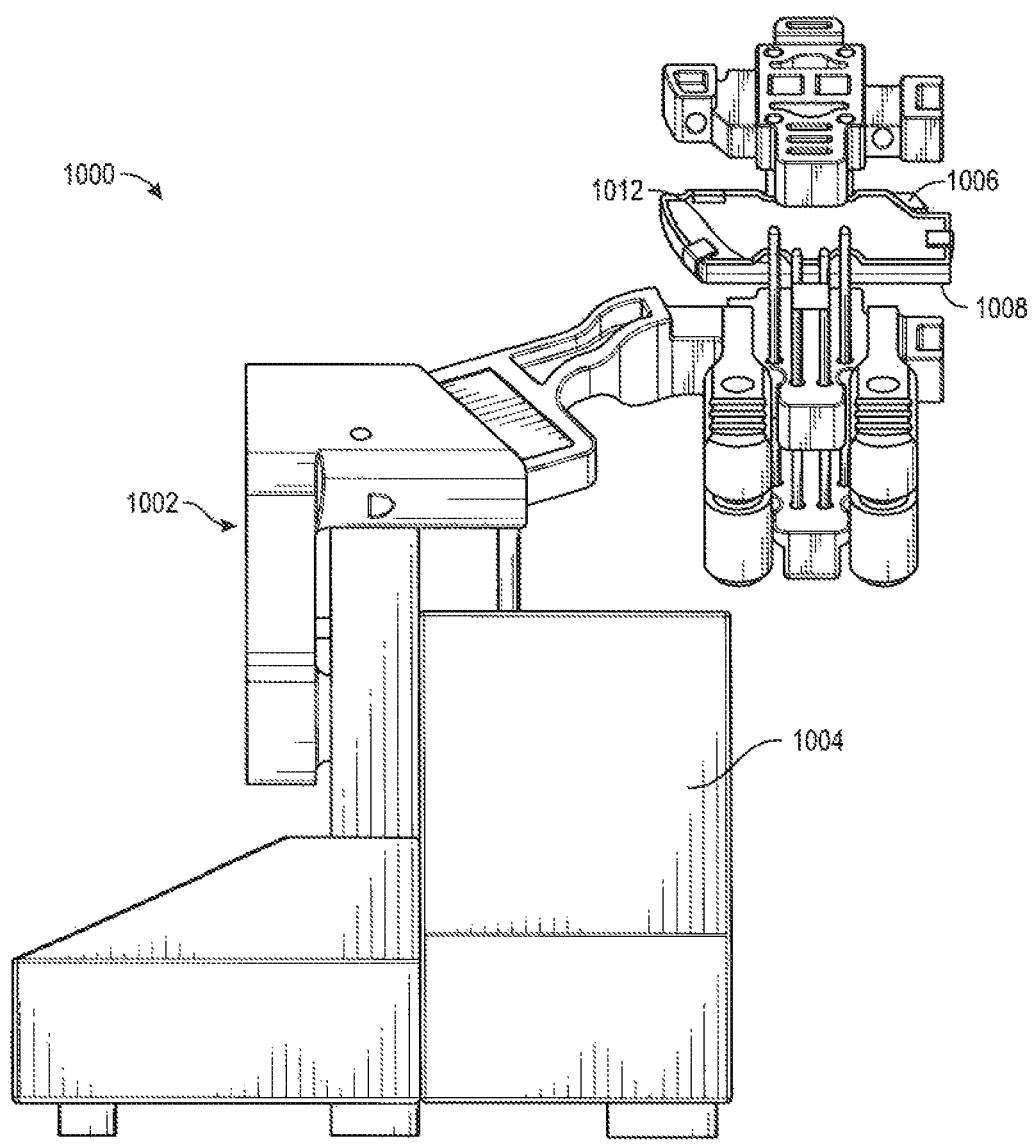
FIG. 10 is a perspective, partially exploded view of an apparatus for manufacture of a stacked electrolytic capacitor configuration including a cathode subassembly, according to an embodiment of the present disclosure.
Figure 11A:
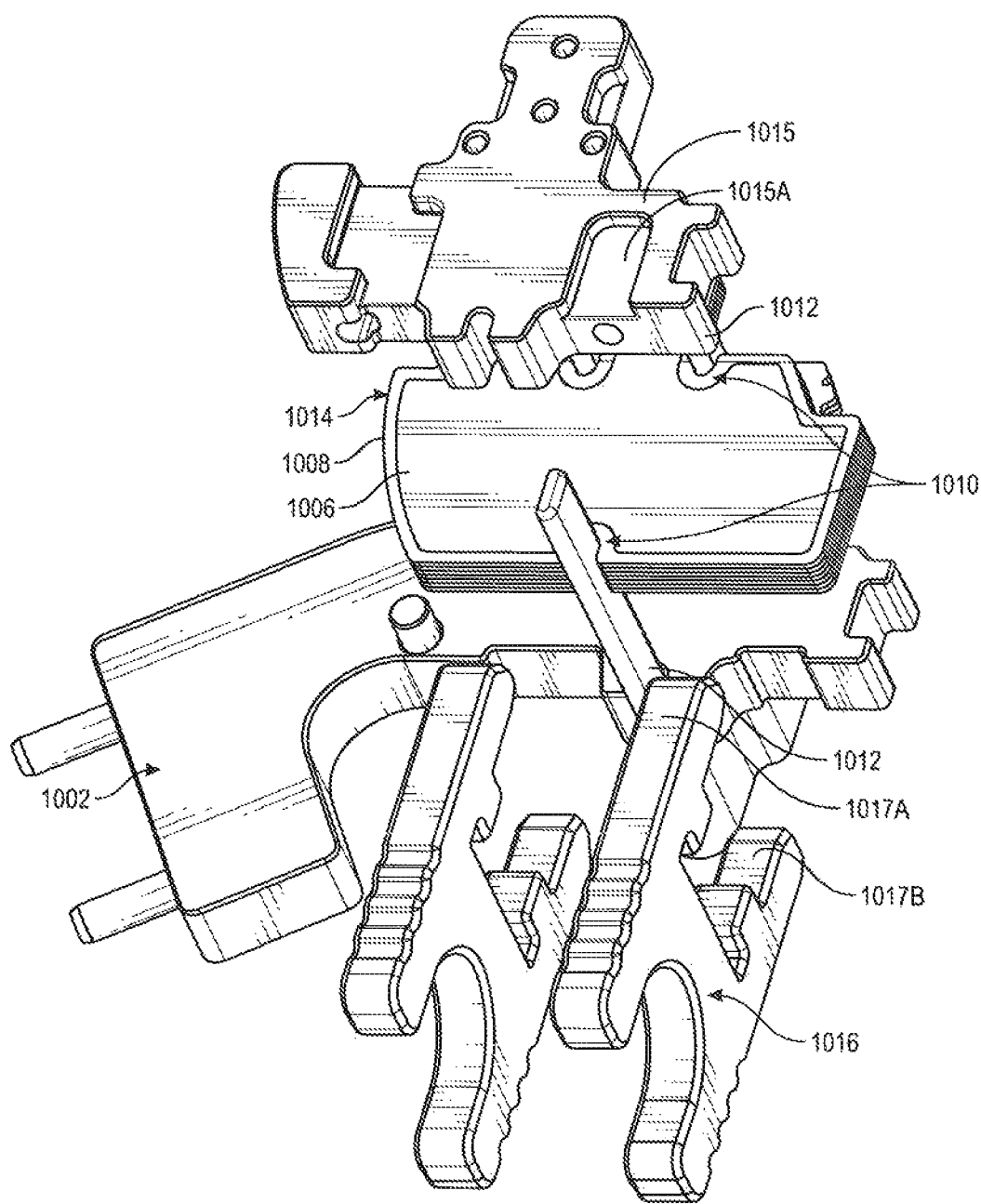
FIG. 11A is an exploded, perspective view of a portion of the apparatus of FIG. 10.
Figure 11B:
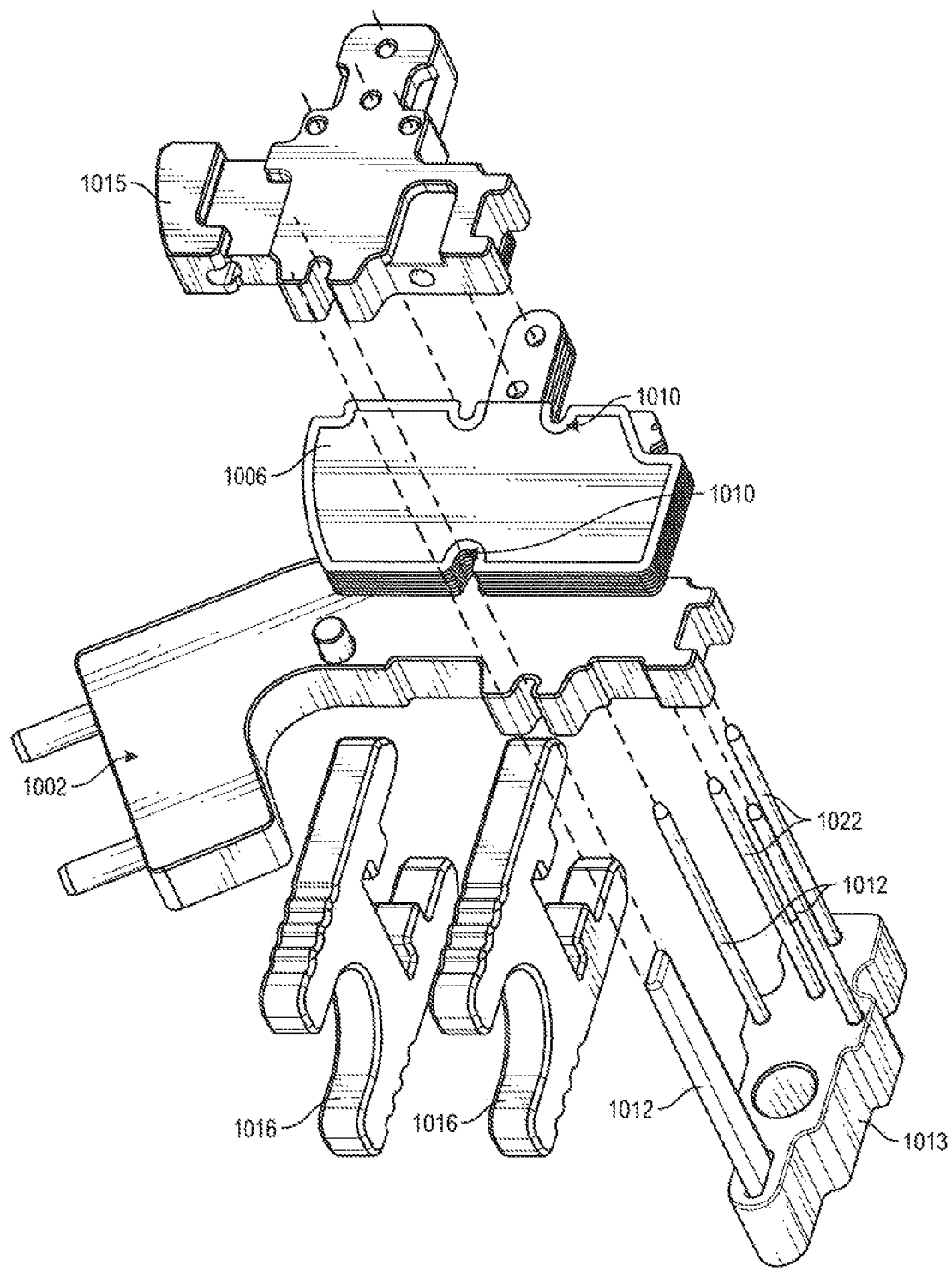
FIG. 11B is another exploded, perspective view of a portion of the apparatus of FIG. 10.

The process 700 may be performed, for example, using a stack assembly apparatus 1000 as illustrated in FIGS. 10, 11A and 11B. Referring to FIGS. 10, 11A and 11B, the stack assembly apparatus 1000 may include an arm 1002 interconnecting a support base 1004 and a stacking fixture or base plate 1006. The base plate 1006 may have a peripheral edge 1008 including recesses 1010 configured to receive alignment elements or pins 1012 that extend from an alignment block 1013, which is at a bottom surface of the base plate, to above a surface 1014 of the base plate. The alignment block 1013 may further include cathode tail alignment pins 1022, which extend above the surface 1014 of the base plate. The alignment elements or pins 1012 may be configured such that an external surface portion thereof facing an interior region of the base plate 1006 has a shape corresponding to a shape of alignment regions at the peripheral edge of the cathode subassembly, as well as other alignment regions of components to be included in a stack with the cathode subassembly. The pins 1012 may be positioned to contact respectively corresponding alignment regions of the cathode subassembly, and also alignment regions respectively of other components that may be included in the stack. In addition, the pins 1022 may be configured and positioned to extend through apertures 229 of the cathode tail of the subassembly 200 when the subassembly 200 is included in a stack formed on the base plate 1006.

Referring to FIG. 9, in block 702, cathode subassemblies, such as those that pass the testing of block 610 as described above, may be placed in a hopper for assembly into a stack using the apparatus 1000, or alternatively for use in a manual process of stack assembly.

In block 704, a cathode subassembly from the hopper may be disposed on the base plate 1006 of a stack assembly apparatus 1000, such as by operation of a robotic assembly device. In particular, the cathode subassembly may be arranged on the base plate 1006 such that the alignment regions are respectively aligned with corresponding alignment elements 1012 which contact the peripheral edge of the cathode subassembly at the portions thereof including the alignment regions. The alignment elements 1012 may provide for precise self-alignment of the peripheral edge of a cathode subassembly with the peripheral edge of other cathode subassemblies and also peripheral edges of anode plates, such as when each of such components is placed one over the other to form a stack. In addition, the apertures 229 in the cathode tails may receive the alignment pins 1022 therethrough, which may further provide for self-alignment of the subassemblies 200 in the stack.

In block 706, an electrode stack may be created by adding one or more anodes, cathodes, separator sheets and cathode subassemblies one over the other, such as on top of a cathode initially disposed directly on the surface 1006 of the base plate. The stack may include any number of anodes, in any desired arrangement with the respect to the cathode subassemblies. In one embodiment, the anode may be an etched foil having an outer periphery having the same configuration as the peripheral edge of the cathode subassembly. The alignment regions of the cathode subassemblies, and similar and corresponding alignment regions that may be provided at the peripheral edge of an anode, may provide for self-alignment of components included in a stack. Further, based on the creation of a stack including the cathode subassemblies together with multiple anodes aligned with one another by the alignment regions, peripheral edge tolerances for the stack may be about +/−0.001 to 0.002 inches. With such tolerances in manufacture of a stack according to the present disclosure, a high packaging efficiency may be obtained for anodes included in the stack, because an anode having an increased functional surface area may be placed within a same volume of a stack.

In one embodiment, the permanent seal in the sealing region at the peripheral edge of the cathode subassembly may permit that the line of sight design constraint at the peripheral edge of a stacked electrolytic configuration including the cathode subassembly is reduced by more than 50% relative to the line of sight design constraint for a peripheral edge of a stack containing individual cathodes whose respective edges are not surrounded by sealed sheet material as in the present disclosure.

Referring again to FIG. 9, in block 708, after a desired stack of anodes and cathode subassemblies in alignment with one another at the respective peripheral edges is formed in block 706, one or more clamps 1016 may be used to hold the stack together and avoid the components of the stack from becoming misaligned before the stack is placed, for example, in a case of a battery. The clamp 1016 may include a top clamping surface 1017A and a bottom clamping surface 1017B. The surface 1017B may be positioned at the bottom surface of the base plate, and the tamp 1015 may then be positioned on top of the stack with the surface 1017A positioned in a recess 1015A of the tamp 1015, such that the stack is held fixed in position between the tamp 1015 and the surface 1014 of the base plate and the components of the stack are not permitted to move and, thus, become misaligned with other components in the stack. The use of multiple clamps 1016 advantageously allows uniform pressure to be applied to the stack at multiple points to insure equal compression within the stack, which also improves packaging efficiency for the stack.

In block 710, tape or an external boot may be applied to maintain the aligned arrangement of the elements of the stack, whose arrangement is held fixed by the clamps 1016 under pressure. Then, the clamps may be suitably removed and a stacked electrolytic capacitor configuration, with the alignment of cathode subassemblies and anodes maintained by the tape, may undergo further manufacturing processing.

Figure 12A:
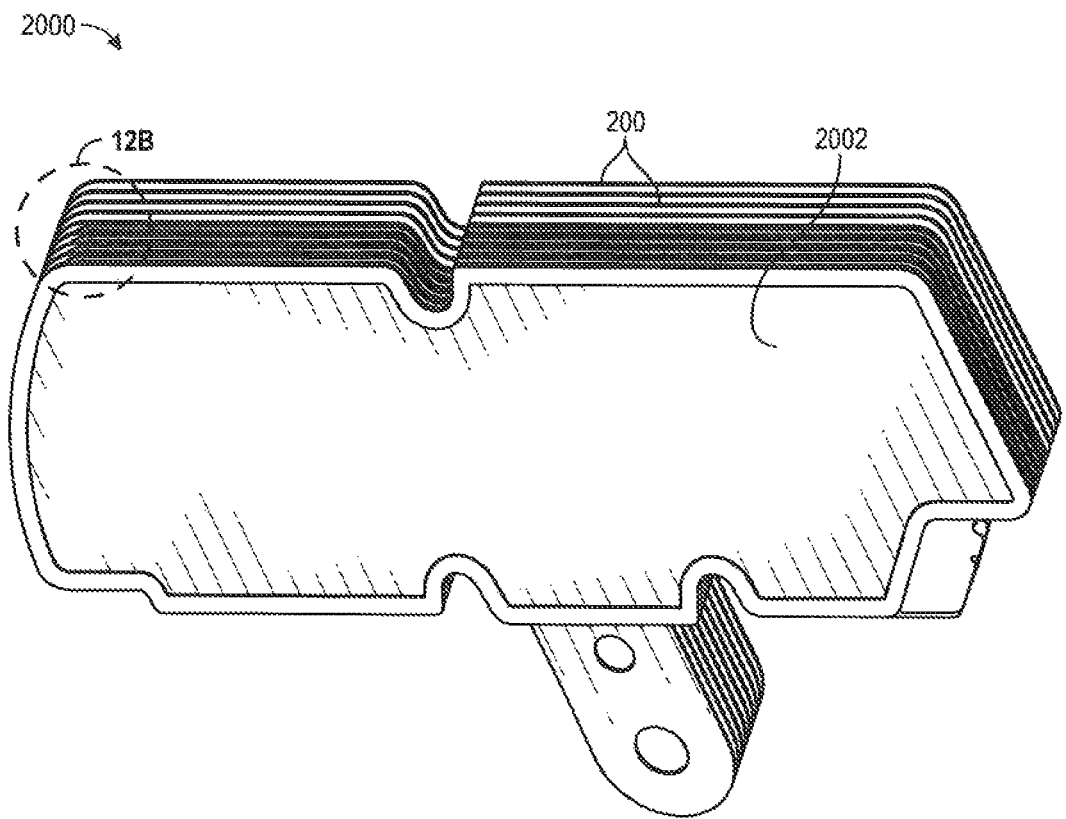
FIG. 12A is a perspective view of a stacked electrolytic capacitor configuration including cathode subassemblies, anodes, cathodes and separator sheets, according to an embodiment of the present disclosure.
Figure 12B:
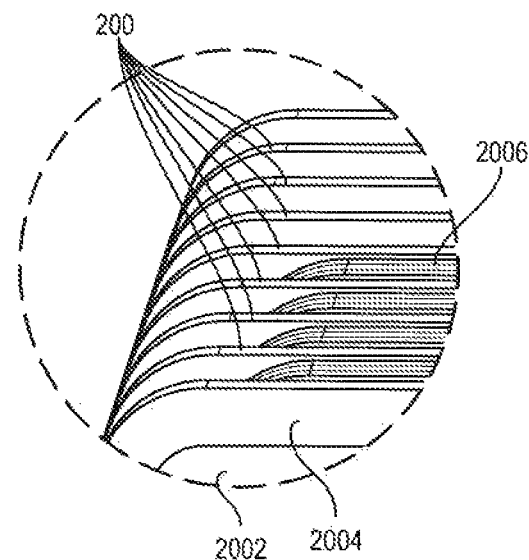
FIG. 12B is an enlarged view of a portion 12B of the stacked electrolytic capacitor configuration of FIG. 12A.

In one embodiment, referring to FIGS. 12A and 12B, an electrolytic capacitor configuration or stack 2000 obtained in block 710 may include a cathode 2002 at each of the top and bottom of the stack 2000, a separator sheet 2004 adjacent an interior surface of each of the top and bottom cathodes 2002 in the stack, and several sets of multiple anodes 2006 and several cathode subassemblies 200. The sets of anodes may be between a cathode 2002 and cathode subassembly 200, or between adjacent cathode assemblies 200. Each component in the stack may have alignment regions at the outermost peripheral edge thereof having a same shape and size as the alignment regions of the cathode subassembly, to provide for self-alignment of all components in the stack.

Figure 13A:
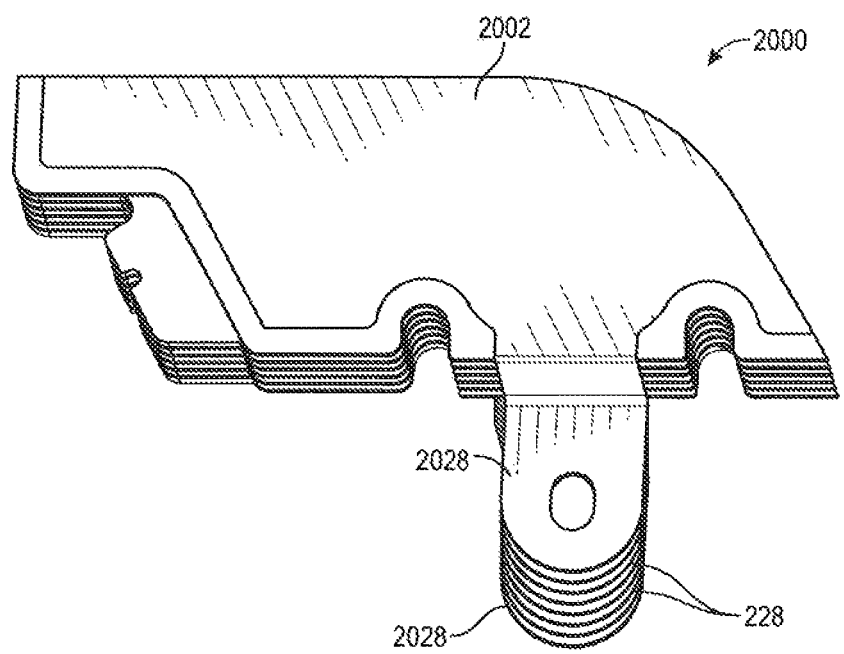
FIG. 13A is a perspective view of a stacked electrolytic capacitor configuration including cathode subassemblies, anodes, cathodes and separator sheets, at a step of manufacture according to an embodiment of the present disclosure.
Figure 13B:
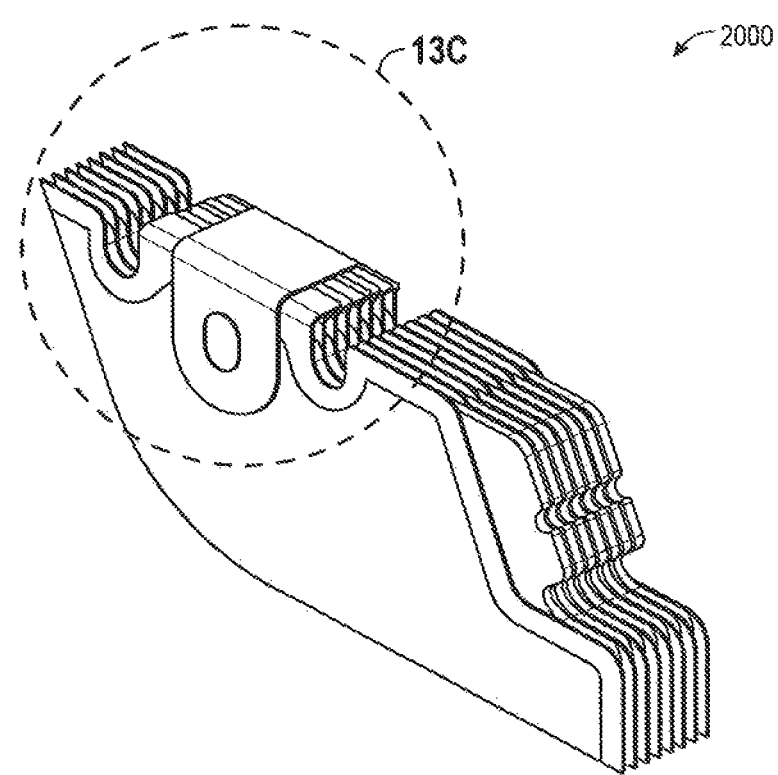
FIG. 13B is a perspective view of the stacked electrolytic capacitor configuration of 13A at another step of manufacture, according to an embodiment of the present disclosure.
Figure 13C:
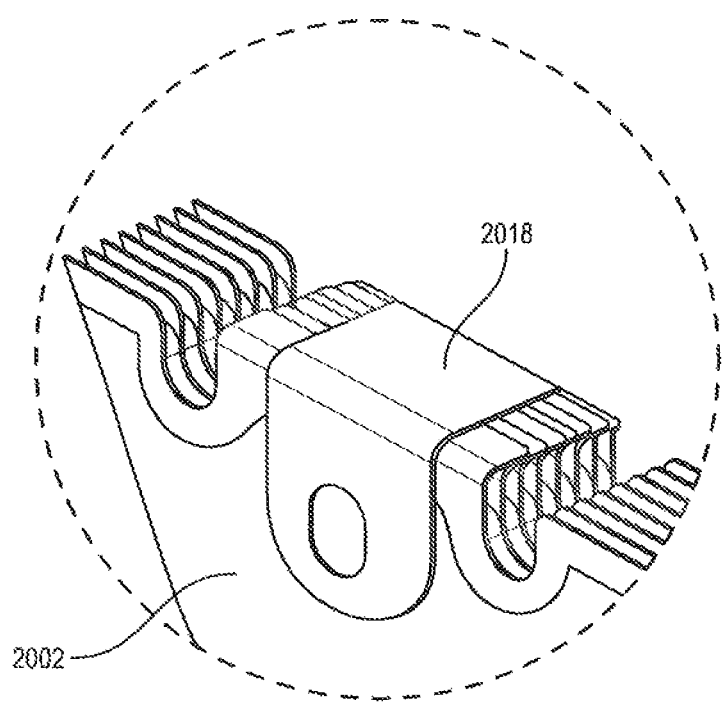
FIG. 13C is an enlarged view of a portion 13C of the stacked electrolytic capacitor configuration of FIG. 13B.

Referring to FIGS. 13A, 13B and 13C, in further steps of manufacture of a stacked electrolytic capacitor configuration according to the present disclosure, a stack, such as the stack 2000 of FIGS. 12A and 12B, may, by automatic or manual means, be configured to fit into a battery device, by joining cathode tails 2028 of the cathodes 2002 and cathode tails 228 of the subassemblies 200 to one another. Referring to FIG. 9, in block 712, a single cathode terminal 2018 may be formed from the cathode tails 2028 and 228, by compressing the cathode tails together at one end of the stack and then bending the cathode tails towards an adjacent peripheral edge of the stack 2000 and into contact with the cathode 2002 at the other end of the stack, and then welding the cathode tails of the stack 2000 together. When the cathode tails are being compressed together at one end of the stack, and when the cathode tails are in an assembled positioned, welded together and extending along the peripheral edge of the stack to form the terminal 2018, the portion of the sheets 202, 204 of the subassemblies 200 at the region 274 may provide a barrier that avoids contact, and maintains a minimum line of sight, between edges of the anodes 2004 and the exposed surfaces of the cathode tails, so as to avoid arc discharge or shorting between the former and latter. The region 274, as discussed above, may be configured to have a size and shape such that the extended separator sheet portion of each of the cathode subassemblies in a stack create a line of sight and contact barrier in view of expected bending of cathode tails during manufacture of a stack. After the cathode tails are welded together, the stack may be placed into a battery device.

Advantageously, the present disclosure may provide for manufacture of a stacked electrolytic capacitor configuration whose components are self-aligned, without the use of complex internal mechanical features of alignment within an interior region of components of the stack, such as anode or cathodes, which may compromise performance, because the functional surface area of the components is replaced by alignment features, such as apertures in the functional areas. Further, the present disclosure of the cathode subassembly improves manufacturability of a completed part of an electrolytic capacitor and increases long-term reliability, based on the inherent elimination of failures resulting from misalignment of components of a stack.

In addition, the present disclosure of the cathode subassembly may provide greater efficiency and lower costs in manufacture of an electrode stack, because an individual element of a separator sheet is not added to the stack for each cathode in the stack during manufacture of the stack. Instead, according to the present disclosure, the stack may be formed by arranging the elements of the cathode subassemblies and anodes one over the other between top and bottom cathode and separator sheets pairs, such as in the stack 2000, without providing additional separator sheets, which simplifies manufacturing process controls and also the number of elements, such as robotic elements, required to manufacture an electrode stack.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A device comprising:
a conductive anode;
a dielectric material disposed on a surface of the conductive anode;
a cathode subassembly, wherein the cathode subassembly includes:
a first separator sheet including a surface having a first region and a second region, wherein the second region extends from a perimeter of the first region to a first peripheral edge of the first separator sheet;
a cathode; and
a second separator sheet having a second peripheral edge, wherein the second peripheral edge is substantially aligned with the first peripheral edge, and wherein the cathode is sandwiched between the first and second separator sheets and disposed within the first region, and
wherein the first and second separator sheets are adhered to each other in a sealing region extending from the second region of the first separator sheet to a region of a surface of the second separator sheet facing the second region, and
wherein the first separator sheet includes at least one first recessed portion at the first peripheral edge aligned with at least one second recessed portion at the second peripheral edge of the second separator sheet; and
an electrolyte disposed between the anode and the cathode subassembly, wherein the first and second peripheral edges respectively of the first and second separator sheets are aligned with a peripheral edge of the anode.

2. The device of claim 1 wherein the substantial alignment of the second peripheral edge with the first peripheral edge is such that the first peripheral edge is within +/−0.05 to 0.002 inches of the second peripheral edge.

3. The device of claim 1, wherein the first and second peripheral edges of the first and second separator sheets have the same shape as the peripheral edge of the anode.

4. The device of claim 1, further comprising:
a plurality of conductive anodes arranged in a stack formation with the cathode subassembly.

5. The device of claim 1, wherein the device is an electrolytic capacitor.

6. The device of claim 1, wherein the first and second separator sheets are permeable to the electrolyte.

7. The device of claim 1, wherein the anode includes an anode recessed portion at the peripheral edge of the anode, and
the anode recessed portion, the first recessed portion, and the second recessed portion being aligned.

8. The device of claim 1, wherein the peripheral edge of the anode is retracted from the first peripheral edge of the first separator sheet.

9. The device of claim 1, wherein the anode includes an anode recessed portion at the peripheral edge of the anode, a peripheral edge of the cathode includes a third recessed portion, and
the anode recessed portion, the first recessed portion, the second recessed portion, and the third recessed portion are aligned.

10. The device of claim 9, wherein an alignment element is received in the anode recessed portion, the first recessed portion, the second recessed portion, and the third recessed portion.

11. The device of claim 10, wherein a portion of the sealing region received in an interior of the third recessed portion is between the alignment element and the third recessed portion.

12. The device of claim 1, wherein the cathode includes a cathode tail that extends through the sealing region and an aperture extends through the cathode tail.

13. The device of claim 12, wherein an alignment element is received in the aperture.

14. The device of claim 13, wherein the cathode is one of multiple cathodes included in the device, each of the cathodes including a cathode tail with the aperture extending through the cathode tail, the alignment element being received in each of the apertures.

15. The device of claim 13, wherein a peripheral edge of the cathode is spaced apart from the sealing region.

16. The device of claim 1, wherein the cathode includes a cathode tail that extends through the sealing region,
a peripheral edge of the cathode includes multiple third recessed portions and the sealing region is positioned in an interior of each of the third recessed portions, and
the tail is positioned between two of the third recessed portions.

17. The device of claim 16, wherein the tail is positioned between the third recessed portions such that a peripheral edge of the tail is continuous with the third recessed portions.

18. A device, comprising:
a conductive anode;
a dielectric material disposed on a surface of the conductive anode;
a cathode subassembly, wherein the cathode subassembly includes:
a first separator sheet including a surface having a first region and a second region, wherein the second region extends from a perimeter of the first region to a first peripheral edge of the first separator sheet;
a cathode; and
a second separator sheet having a second peripheral edge, wherein the second peripheral edge is substantially aligned with the first peripheral edge, and wherein the cathode is sandwiched between the first and second separator sheets and disposed within the first region, and
wherein the first and second separator sheets are adhered to each other in a sealing region extending from the second region of the first separator sheet to a region of a surface of the second separator sheet facing the second region, and
wherein the first separator sheet includes at least one first recessed portion at the first peripheral edge aligned with at least one second recessed portion at the second peripheral edge of the second separator sheet; and
an electrolyte disposed between the anode and the cathode subassembly, wherein the first and second peripheral edges respectively of the first and second separator sheets are aligned with a peripheral edge of the anode;
wherein the cathode includes a cathode tail that extends through the sealing region, a peripheral edge of the cathode includes multiple third recessed portions and the sealing region is positioned in an interior of each of the third recessed portions, and the tail is positioned between two of the third recessed portions; and wherein another one of the third recessed portions is positioned on a side of the peripheral edge of the cathode that is opposite from the two third recessed portions.

19. A device, comprising:

a conductive anode;

a dielectric material disposed on a surface of the conductive anode;

a cathode subassembly, wherein the cathode subassembly includes:

a first separator sheet including a surface having a first region and a second region, wherein the second region extends from a perimeter of the first region to a first peripheral edge of the first separator sheet;

a cathode; and a second separator sheet having a second peripheral edge, wherein the second peripheral edge is substantially aligned with the first peripheral edge, and wherein the cathode is sandwiched between the first and second separator sheets and disposed within the first region, and wherein the first and second separator sheets are adhered to each other in a sealing region extending from the second region of the first separator sheet to a region of a surface of the second separator sheet facing the second region, and wherein the first separator sheet includes at least one first recessed portion at the first peripheral edge aligned with at least one second recessed portion at the second peripheral edge of the second separator sheet; and an electrolyte disposed between the anode and the cathode subassembly, wherein the first and second peripheral edges respectively of the first and second separator sheets are aligned with a peripheral edge of the anode;

wherein the cathode includes a cathode tail that extends through the sealing region, a peripheral edge of the cathode includes a third recessed portion and the sealing region is positioned in an interior of the third recessed portion, and the third recessed portion is positioned on a side of the peripheral edge of the cathode that is opposite from the cathode tail.

20. The device of claim 19, wherein the first recessed portion and the second recessed portion are received in the third recessed portion.

* * * * *